(12) United States Patent
Connors et al.

(10) Patent No.: US 11,134,426 B2
(45) Date of Patent: Sep. 28, 2021

(54) MULTIPLE NETWORK ACCESS SYSTEM AND METHOD

(71) Applicant: Wi-LAN INC., Ottawa (CA)

(72) Inventors: Dennis P. Connors, San Diego, CA (US); Gene W. Marsh, Del Mar, CA (US)

(73) Assignee: WI-LAN INC., Ottawa (CA)

( * ) Notice: Subject to any disclaimer, the term of this patent is extended or adjusted under 35 U.S.C. 154(b) by 0 days.

(21) Appl. No.: 16/909,347

(22) Filed: Jun. 23, 2020

(65) Prior Publication Data

US 2020/0322859 A1 Oct. 8, 2020

Related U.S. Application Data

(63) Continuation of application No. 16/298,332, filed on Mar. 11, 2019, now Pat. No. 10,694,440, which is a continuation of application No. 15/665,174, filed on Jul. 31, 2017, now Pat. No. 10,231,161, which is a continuation of application No. 14/042,595, filed on Sep. 30, 2013, now Pat. No. 9,723,529, which is a continuation of application No. 11/627,897, filed on Jan. 26, 2007, now Pat. No. 8,548,520.

(51) Int. Cl.
*H04W 36/14* (2009.01)
*H04L 12/66* (2006.01)

(52) U.S. Cl.
CPC ............ *H04W 36/14* (2013.01); *H04L 12/66* (2013.01)

(58) Field of Classification Search
CPC ........ H04W 36/14; H04W 76/11; H04L 12/66
See application file for complete search history.

(56) References Cited

U.S. PATENT DOCUMENTS

| | | |
|---|---|---|
| 5,452,288 A | 9/1995 | Rahuel et al. |
| 5,544,198 A | 8/1996 | Saalfrank et al. |
| | (Continued) | |

FOREIGN PATENT DOCUMENTS

| | | |
|---|---|---|
| EP | 1 237 371 | 9/2002 |
| EP | 1 594 330 | 11/2005 |
| | (Continued) | |

OTHER PUBLICATIONS

Digital Video Broadcasting (DVB); Transmission System for Handheld Terminals (DVB-H), ETSI EN 302 304 V1.1.1 (Nov. 2004).

(Continued)

*Primary Examiner* — Myron Wyche
(74) *Attorney, Agent, or Firm* — Volpe Koenig

(57) ABSTRACT

Methods and devices for operating a wireless communication device that can communicate with at least two different wireless networks using a single radio frequency modem are described. The communication device attaches to a first wireless network through the radio frequency (RF) modem, and then detaches from the first wireless network at a predetermined time before a start time of a selected event on a second wireless network. The device attaches to the second wireless network using the same RF modem before the start time of the selected event and collects at least a portion of event data associated with the selected event. After collecting at least a portion of event data, the device detaches from the second wireless network and re-attaches to the first wireless network.

20 Claims, 7 Drawing Sheets

(56) References Cited

U.S. PATENT DOCUMENTS

| | | |
|---|---|---|
| 5,659,685 A | 8/1997 | Williams et al. |
| 5,740,534 A | 4/1998 | Ayerst et al. |
| 5,828,659 A | 10/1998 | Teder et al. |
| 5,867,791 A | 2/1999 | Chambert |
| 5,892,910 A | 4/1999 | Safadi |
| 6,009,325 A | 12/1999 | Retzer et al. |
| 6,112,100 A | 8/2000 | Ossoinig et al. |
| 6,172,988 B1 | 1/2001 | Tiernan et al. |
| 6,192,038 B1 | 2/2001 | Wallerius et al. |
| 6,212,190 B1 | 4/2001 | Mulligan et al. |
| 6,502,131 B1 | 12/2002 | Vaid et al. |
| 6,504,830 B1 | 1/2003 | Ostberg et al. |
| 6,628,638 B1 | 9/2003 | Sato et al. |
| 6,721,797 B1 | 4/2004 | Kim |
| 6,847,826 B1 | 1/2005 | Wesby et al. |
| 6,898,640 B1 | 5/2005 | Kurita et al. |
| 7,035,215 B1 | 4/2006 | Engdahl |
| 7,058,407 B2 | 6/2006 | Chi et al. |
| 7,099,348 B1 | 8/2006 | Warwick et al. |
| 7,107,061 B1 | 9/2006 | Tontiruttananon et al. |
| 7,242,960 B2 | 7/2007 | Van Rooyen |
| 7,283,817 B2 | 10/2007 | Salo et al. |
| 7,301,905 B1 | 11/2007 | Tontiruttananon et al. |
| 7,324,832 B2 | 1/2008 | Van Rooyen |
| 7,333,829 B2 | 2/2008 | Malone et al. |
| 7,349,386 B1 * | 3/2008 | Gou .................. H04L 29/06027 370/356 |
| 7,362,735 B2 | 4/2008 | Mantha |
| 7,421,244 B2 | 9/2008 | Van Rooyen |
| 7,450,899 B2 | 11/2008 | Roberts et al. |
| 7,469,413 B1 | 12/2008 | Mizutome et al. |
| 7,522,536 B2 | 4/2009 | Roberts et al. |
| 7,593,738 B2 | 9/2009 | Anderson |
| 7,599,327 B2 | 10/2009 | Zhuang |
| 7,599,668 B2 | 10/2009 | Ozluturk et al. |
| 7,613,104 B2 | 11/2009 | Bhatt et al. |
| 7,768,966 B2 | 8/2010 | Yoon et al. |
| 8,910,223 B2 | 12/2014 | Huang |
| 2001/0030956 A1 | 10/2001 | Chillariga et al. |
| 2001/0046240 A1 | 11/2001 | Longoni et al. |
| 2002/0061012 A1 | 5/2002 | Thi et al. |
| 2002/0086691 A1 | 7/2002 | Zoran et al. |
| 2002/0137472 A1 * | 9/2002 | Quinn .................. H04B 1/406 455/553.1 |
| 2002/0138560 A1 | 9/2002 | Aaltonen et al. |
| 2002/0160784 A1 | 10/2002 | Kuwahara |
| 2002/0167962 A1 | 11/2002 | Kowalski |
| 2003/0002474 A1 | 1/2003 | Alexander et al. |
| 2003/0072255 A1 | 4/2003 | Ma et al. |
| 2003/0095513 A1 | 5/2003 | Woodmansee et al. |
| 2003/0139140 A1 | 7/2003 | Chen |
| 2004/0017777 A1 | 1/2004 | Chaudhuri et al. |
| 2004/0141502 A1 | 7/2004 | Corson et al. |
| 2004/0153767 A1 | 8/2004 | Dolgonos |
| 2004/0223449 A1 | 11/2004 | Tsuie et al. |
| 2004/0223477 A1 * | 11/2004 | Iwasaki .................. H04W 48/16 370/338 |
| 2004/0229624 A1 | 11/2004 | Cai et al. |
| 2004/0233933 A1 | 11/2004 | Munguia |
| 2005/0002323 A1 | 1/2005 | Hadad |
| 2005/0033990 A1 * | 2/2005 | Harvey .................. H04L 63/105 726/4 |
| 2005/0090235 A1 | 4/2005 | Vermola et al. |
| 2005/0117070 A1 | 6/2005 | Wu et al. |
| 2005/0118946 A1 | 6/2005 | Colban et al. |
| 2005/0130661 A1 | 6/2005 | Aerrabotu et al. |
| 2005/0153650 A1 | 7/2005 | Hikimoto |
| 2005/0157735 A1 | 7/2005 | Kan et al. |
| 2005/0232271 A1 | 10/2005 | Kettunen et al. |
| 2005/0237960 A1 | 10/2005 | Kim |
| 2005/0286408 A1 | 12/2005 | Jin et al. |
| 2006/0025079 A1 | 2/2006 | Sutskover et al. |
| 2006/0034250 A1 | 2/2006 | Kim et al. |
| 2006/0039285 A1 | 2/2006 | Chapman et al. |
| 2006/0062200 A1 | 3/2006 | Wang et al. |
| 2006/0079224 A1 | 4/2006 | Welnick et al. |
| 2006/0088023 A1 | 4/2006 | Muller |
| 2006/0098676 A1 | 5/2006 | Cai et al. |
| 2006/0128426 A1 | 6/2006 | Van Rooyen |
| 2006/0153132 A1 | 7/2006 | Saito |
| 2006/0153147 A1 | 7/2006 | Chillariga et al. |
| 2006/0153227 A1 | 7/2006 | Hwang et al. |
| 2006/0153232 A1 | 7/2006 | Shvodian |
| 2006/0193286 A1 | 8/2006 | Naghian et al. |
| 2006/0205406 A1 | 9/2006 | Pekonen et al. |
| 2006/0233359 A1 | 10/2006 | Jung et al. |
| 2006/0239264 A1 | 10/2006 | Kang et al. |
| 2006/0227718 A1 | 11/2006 | Wang et al. |
| 2006/0244865 A1 | 11/2006 | Simon |
| 2006/0246890 A1 | 11/2006 | Yasuda et al. |
| 2006/0262744 A1 | 11/2006 | Xu et al. |
| 2006/0262751 A1 | 11/2006 | Vermola et al. |
| 2006/0262793 A1 | 11/2006 | Vare et al. |
| 2006/0268673 A1 | 11/2006 | Roh et al. |
| 2006/0285508 A1 | 12/2006 | Vermola et al. |
| 2007/0026866 A1 | 2/2007 | Krishnamurthi et al. |
| 2007/0070180 A1 | 3/2007 | Van Rooven |
| 2007/0091857 A1 | 4/2007 | Elstermann |
| 2007/0104140 A1 * | 5/2007 | Ashish .................. H04W 16/10 370/329 |
| 2007/0140241 A1 | 6/2007 | Asbun |
| 2007/0165104 A1 | 7/2007 | Khan et al. |
| 2007/0165575 A1 | 7/2007 | Niwano |
| 2007/0167159 A1 | 7/2007 | Ramesh et al. |
| 2007/0171910 A1 * | 7/2007 | Kumar .................. H04W 76/11 370/392 |
| 2007/0223612 A1 | 9/2007 | Simon |
| 2007/0240188 A1 | 10/2007 | Vermola et al. |
| 2007/0249380 A1 | 10/2007 | Stewart et al. |
| 2007/0274253 A1 | 11/2007 | Zhang et al. |
| 2007/0297366 A1 * | 12/2007 | Osann .................. H04W 40/06 370/331 |
| 2008/0008176 A1 | 1/2008 | Lim et al. |
| 2008/0037460 A1 | 2/2008 | Venkatachalam |
| 2008/0043888 A1 | 2/2008 | Bhukania et al. |
| 2008/0049749 A1 | 2/2008 | Xiao et al. |
| 2008/0096569 A1 | 4/2008 | Khandekar |
| 2008/0107047 A1 | 5/2008 | Olfat |
| 2008/0137652 A1 | 6/2008 | Herrmann et al. |
| 2008/0152018 A1 | 6/2008 | Ma et al. |
| 2008/0165283 A1 | 7/2008 | Brandt et al. |
| 2008/0170529 A1 | 7/2008 | Connors et al. |
| 2008/0170530 A1 | 7/2008 | Connors et al. |
| 2008/0198785 A1 | 8/2008 | Huang |
| 2008/0205322 A1 | 8/2008 | Cai et al. |
| 2008/0259813 A1 | 10/2008 | Matta et al. |
| 2008/0316943 A1 | 12/2008 | Mosker et al. |
| 2009/0028276 A1 | 1/2009 | Van Rooyen |
| 2009/0129334 A1 | 5/2009 | Ma et al. |
| 2009/0219909 A1 | 9/2009 | Ko et al. |
| 2009/0252070 A1 | 10/2009 | Connors et al. |
| 2010/0020686 A1 | 1/2010 | Lee et al. |
| 2010/0056166 A1 | 3/2010 | Tenny |
| 2010/0077173 A1 | 3/2010 | Rao et al. |
| 2010/0177643 A1 | 7/2010 | Matta et al. |
| 2010/0241613 A1 | 9/2010 | Rao |
| 2012/0176952 A1 | 7/2012 | Huang et al. |
| 2013/0064253 A1 | 3/2013 | Helms et al. |

FOREIGN PATENT DOCUMENTS

| | | |
|---|---|---|
| JP | 2003-018108 | 1/2003 |
| JP | 2005-323112 | 11/2005 |
| JP | 2006-074500 | 3/2006 |
| JP | 2006-081171 | 3/2006 |
| KR | 2004-0000953 | 1/2004 |
| KR | 2005-0017046 | 2/2005 |
| TW | I 268674 | 12/2006 |
| TW | I 269546 | 12/2006 |
| WO | 01/15455 | 3/2001 |
| WO | 01/50782 | 7/2001 |
| WO | 03/030451 | 4/2003 |
| WO | 03/081938 | 10/2003 |
| WO | 06/047941 | 5/2006 |

(56) References Cited

FOREIGN PATENT DOCUMENTS

| WO | 06/099322 | 9/2006 |
|---|---|---|
| WO | 06/105010 | 10/2006 |
| WO | 06/138556 | 12/2006 |
| WO | 07/010444 | 1/2007 |

OTHER PUBLICATIONS

"Mobile WiMAX—Part 1: A Technical Overview and Performance Evaluation," WiMAX Forum, pp. 1-53 (Aug. 2006).
"Mobile WiMAX—Part II: A Comparitive Analysis," WiMAX Forum, pp. 1-47 (May 2006).
Faria et al., "DVB-H: Digital Broadcast Services to Handheld Devices," Proceedings of the IEEE, vol. 94, No. 1, pp. 194-209 (Jan. 2006).
IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the Microwave Theory and Techniques Society, IEEE Std. 802. 16e—2005 and IEEE Std. 802.16-2004/Cor1-2005 (Feb. 28, 2006).
IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).
International Search Report and Written Opinion for PCT/US2008/050365 dated Sep. 4, 2008.
International Search Report and Written Opinion for PCT/US2008/057875 dated Aug. 20, 2008.
International Search Report and Written Opinion for PCT/US2008/060518 dated Sep. 4, 2008.
International Search Report and Written Opinion for PCT/US2008/060517 dated Aug. 27, 2008.
International Search Report/Written Opinion issued in PCT/US08/50500 dated May 26, 2008.
International Search Report/Written Opinion issued in PCT/US08/50743 dated May 13, 2008.
International Search Report/Written Opinion issued in PCT/US2008/057883 dated Jul. 29, 2008.
International Search Report/Written Opinion issued in PCT/US2008/050719 dated Jun. 24, 2008.
International Search Report/Written Opinion issued in PCT/US2008/050302 dated Jul. 9, 2008.
Partial International Search Report issued in PCT/US2008/050369 dated Jun. 26, 2008.
Qualcomm Corporation, "Flo Technology Brief," www.qualcomm.com/mediaflo (2005).
Qualcomm Corporation, "MediaFlo System," www.qualcomm.com/mediaflo (2005).
Qualcomm Corporation, "MediaFlo Technology Overview," www.qualcomm.com/mediaflo (2007).
Wang et al., "System Architecture and Cross-Layer Optimization of Video Broadcast over WiMAX," IEEE Journal on Selected Areas in Communication, vol. 25, No. 4, pp. 712-721 (May 2007).
Wikipedia, "IP Fragmentation," pp. 1-2 (Dec. 29, 2006).
Riley et al., "Quality of Service Issues for MPEG-2 Video Over ATM," International Broadcasting Convention, pp. 583-587 (Sep. 1996).

\* cited by examiner

MULTIPLE NETWORK ACCESS SYSTEM AND METHOD

CROSS REFERENCE TO RELATED APPLICATION

This application is a continuation of U.S. patent application Ser. No. 16/298,332, filed Mar. 11, 2019, which is a continuation of U.S. patent application Ser. No. 15/665,174, filed Jul. 31, 2017, which issued as U.S. Pat. No. 10,231,161 on Mar. 12, 2019 which is a continuation of U.S. patent application Ser. No. 14/042,595, filed Sep. 30, 2013, which issued as U.S. Pat. No. 9,723,529 on Aug. 1, 2017, which is a continuation of U.S. patent application Ser. No. 11/627,897, filed Jan. 26, 2007 which issued as U.S. Pat. No. 8,548,520 on Oct. 1, 2013, which is incorporated by reference as if fully set forth.

FIELD OF INVENTION

The present disclosure relates generally to wireless network systems, and is concerned with a system and method for accessing two or more networks in which a wireless communication device such as a handset, personal computer, personal digital assistant (PDA) or the like can alternate or switch between at least two networks on orthogonal channels, one of which may be dedicated to transmission of multimedia data.

BACKGROUND

Wireless consumers continually demand new services from wireless service providers. One new service for which a particularly high consumer demand is expected is wireless video service. Some industry experts have described wireless video as the intersection of the two biggest consumer electronic successes of all time: the cell phone and the television.

Providing video service via a wireless communication network presents many challenges. The amount of data that must be transmitted to provide a user with video service is very large in comparison with the capacity available from conventional two-way networks. Some video service networks may be implemented separately from conventional two-way service networks. A separate network implementation allows the video service network to be specifically designed for efficient video content dissemination.

High functionality subscriber stations will want to provide many types of service to the consumer. In order to do so, the subscriber station device may need to access several distinct wireless communication networks.

Therefore, there is a need for improved systems, apparatus, and techniques for accessing multiple wireless networks from a single device.

SUMMARY

Embodiments described herein provide methods, systems, media and devices for accessing at least two different networks with a wireless communication device.

According to an aspect of the present disclosure, in one embodiment, a method of operating a wireless communication device to communicate with at least two different wireless networks using a single radio frequency modem, includes attaching the wireless device to a first wireless network through the radio frequency (RF) modem. Then detaching the wireless device from the first wireless network at a predetermined time before a start time of a selected event on a second wireless network. Attaching the wireless device to the second wireless network using the same RF modem before the start time of the selected event and collecting, at the wireless device, at least a portion of event data associated with the selected event that is transmitted from the second wireless network after the start time of the selected event. Then, after collection of the at least a portion of event data, detaching the wireless device from the second wireless network and after detachment from the second wireless network, re-attaching the wireless device to the first wireless network.

In another embodiment, a subscriber station, such as a wireless communication device, operates on at least two different wireless networks. The subscriber station includes a radio frequency (RF) modem configured to attach to a first wireless network and a second wireless network. The subscriber station also includes a network attachment arbitrator module configured to store timing information of event data bursts associated with a selected event of the second wireless network, and to control the RF modem to attach to the first wireless network during times when the data bursts associated with the selected event do not occur and to attach to the second wireless network during times when the data bursts associated with the selected event occur. The subscriber station includes an application module which collects at least a portion of event data by collecting event data from the event data bursts associated with the selected event when the RF modem is attached to the second wireless network.

In a further embodiment, a method of operating a communication device to communicate with at least two different networks using a single modem includes establishing a first connection with a first wireless network via the modem. Then receiving, via the first connection with the first wireless network, second network state information associated with a second wireless network, and establishing, with the use of the second network state information, a connection with the second wireless network via the modem.

Another embodiment is directed to a wireless communication device for communication over at least two wireless networks which includes a radio frequency (RF) modem, and a network attachment arbitrator module which is linked to the RF modem. The network attachment arbitrator controls the RF modem to establish a first connection with a first wireless network and a second connection with a second wireless network on an alternating basis. The device also includes an application module which is linked to the RF modem and to the network attachment arbitrator module and which receives second network state information associated with the second wireless network via the first connection with the first wireless network and sends the second network state information to the RF modem for use in the establishment of the second connection with the second wireless network.

In a further embodiment, a multiple network system includes a first wireless network having a plurality of base stations. The system also includes a second wireless network having a plurality of base stations. In the system there is at least one wireless communication device, or subscriber station, that includes a radio frequency (RF) modem configured to attach to the first wireless network and the second wireless network. The wireless communication device also includes a network attachment arbitrator module configured to store timing information of event data bursts associated with a selected event of the second wireless network. The network attachment arbitrator also controls the RF modem to attach to the first wireless network during times when the data bursts associated with the selected event do not occur, and to attach to the second wireless network during times when the data bursts associated with the selected event do occur. In addition, the wireless communication device includes an application module which collects at least a portion of event data by collecting event data from the event data bursts associated with the selected event when the RF modem is attached to the second wireless network.

Other features and advantages of the present disclosure will become more readily apparent to those of ordinary skill in the art after reviewing the following detailed description and accompanying drawings.

BRIEF DESCRIPTION OF THE DRAWINGS

The details of the present disclosure, both as to its structure and operation, will be better understood from the following detailed description of some exemplary embodiments, taken in conjunction with the accompanying drawings, in which like reference numerals refer to like parts, and in which.

DETAILED DESCRIPTION OF THE PREFERRED EMBODIMENTS

FIGS. 1 to 8 illustrate methods and systems according to exemplary embodiments of the present disclosure for accessing two or more wireless networks from a single device. In particular, an exemplary embodiment of the present disclosure is directed to switching a wireless communication device such as a subscriber station (SS) between two different networks using a single radio frequency (RF) modem (transceiver). The subscriber station (SS) may be a fully mobile, portable or fixed-location device such a cell phone, personal media player (PMP), personal digital assistant (PDA), personal video recorder (PVR), personal computer, wall mounted wireless television or the like.

After reading this description it will become apparent to one skilled in the art how to implement the present disclosure in various alternative embodiments and alternative applications. However, although various embodiments of the present disclosure will be described herein, it is understood that these embodiments are presented by way of example only, and not limitation. As such, this detailed description of various alternative embodiments should not be construed to limit the scope or breadth of the present disclosure as set forth in the appended claims.

Figure 1:
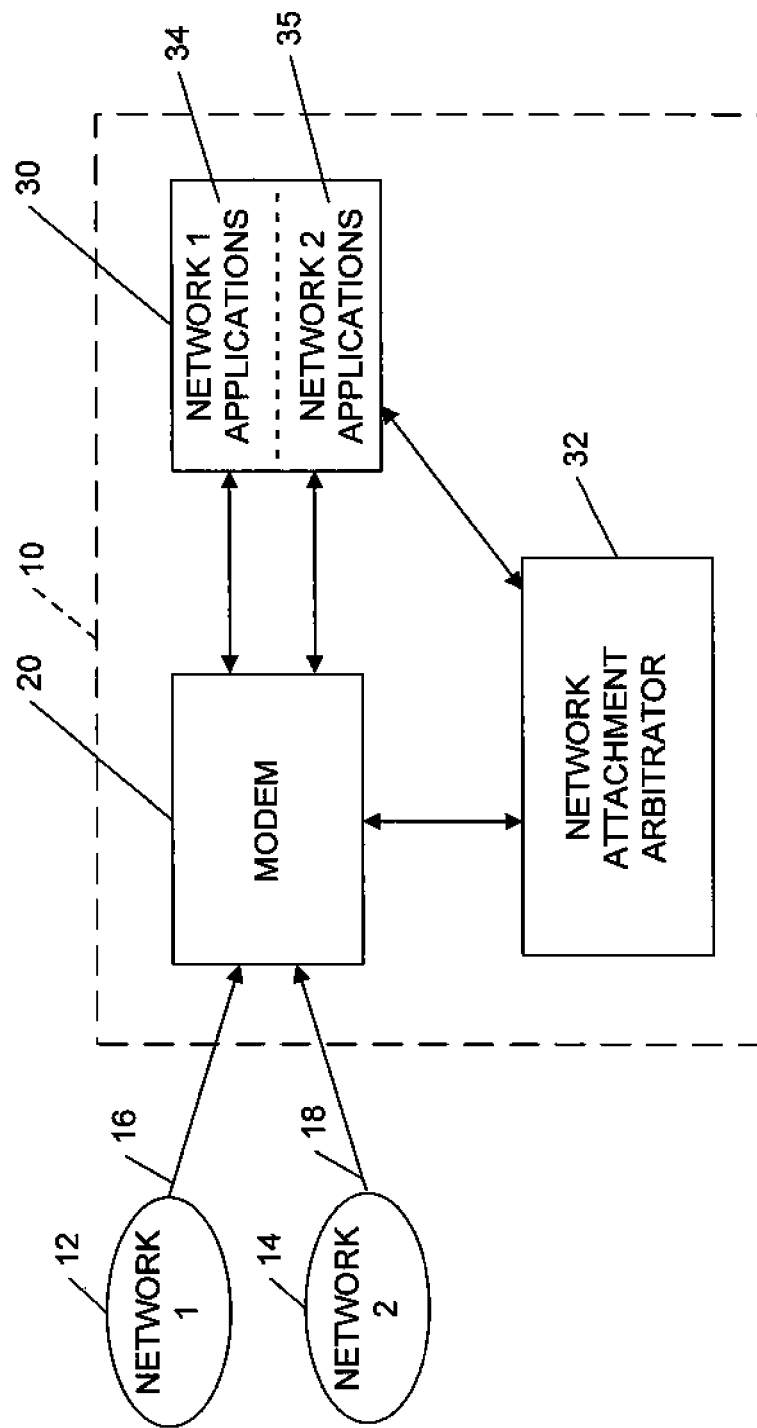
FIG. 1 is a block diagram of a multiple network access system according to one embodiment.

FIG. 1 illustrates a multiple network access system according to one embodiment in which a subscriber station can access two different networks. A wireless network typically includes a plurality of base stations spread over a geographical area. A base station (BS) may be a conventional wide area base station or an access point (AP), gateway, portal, or other wireless entry port to the network. The wireless network may also include wireless subscriber stations or communication devices which may be fixed or mobile. For example, a fixed-location wireless subscriber station may be located in a home or office building.

As illustrated in FIG. 1, a subscriber station 10 can access first and second networks 12 and 14 over a wireless communication channels, such as orthogonal or non-interfering channels 16, 18, through a single modem 20. Subscriber station 10 attaches through wireless channels 16, 18 to networks 12, 14, respectively. The modem 20 comprises a radio (both transmitter TX and receiver RX) in communication with at least one antenna, and a baseband receiver with a host interface.

In one embodiment, a subscriber station is attached to a network when its RF module is tuned to the frequency band used by the network and is synchronized to the arriving waveform from the network so that the PHY module and the MAC module in the subscriber station can receive information over the network. Being attached to a given network does not necessarily imply any form of logical connection or association with that network. Similarly, being detached from a given network does not necessarily imply that a previously established logical connection, registration, or association with that network is torn down. The concepts of "association" with a network and "attachment" to a network are discussed in further detail herein.

In one embodiment, each network 12 and 14 may have a separate set of base stations. Alternatively, the same physical base stations or locations may be used for both networks 12 and 14. For example, a base station may have a separate transmitter or access node for each network 12 and 14. The networks 12 and 14 may both be unidirectional networks. Alternatively, both networks 12 and 14 may be bidirectional communication networks, or one network may be unidirectional while the other is bidirectional. Exemplary embodiments described below with respect to FIGS. 4 to 8 include one network which is a bidirectional network and another network which is a unidirectional network.

In a bidirectional network, the subscriber station is capable of both receiving information and transmitting information via the air interface channel of the bidirectional network. In a unidirectional network, the subscriber station is capable of only receiving information from the air interface channel of the unidirectional network. In addition, in some embodiments, the subscriber station may utilize a backchannel communication link, other than the air interface channel of the unidirectional network, to access a backend system which feeds the unidirectional network. The backchannel communication link can be a low-rate non-realtime backchannel, such as via a PC docking station for the subscriber station, a disassociated wireless backchannel such as WiFi, or some other type of backchannel, which allows the subscriber station to transmit at least a limited amount of information to the backend system. For example, in one embodiment of a unidirectional network, the backchannel communication link can be used by the subscriber station to order/pay for programs, to obtain access rights, etc. The backchannel communication link can communicate via the Internet to a backend system module that is associated with the unidirectional wireless network. In this manner, the subscriber station can use the backchannel communication link to pay for and/or order a content program, upon which an access code is downloaded via the backchannel communication link to the subscriber station. Then, the next time the subscriber station is attached to the unidirectional wireless network, it can receive, extract and decode (using the access code) the ordered program from the transmitted signal of the unidirectional network.

The modem 20 may have only a radio frequency (RF) receiver if the two networks are both unidirectional, networks, or may have an RF transmitter/receiver (modem) if at least one of the networks is a bidirectional network having both up and down links. In one embodiment, the second network 14 is a Digital Video Broadcasting-Handheld (DVB-H) over WiMAX unidirectional broadcast network, such as one of the embodiments of a wireless broadcast network described in co-pending U.S. patent application Ser. No. 11/623,032, entitled "Wireless Broadcast System," filed on Jan. 12, 2007, the contents of which are incorporated herein by reference.

Although only one subscriber station 10 is illustrated in FIG. 1, the system may comprise multiple subscriber stations 10 capable of communicating with two different networks through a single modem platform. Additionally, the system may be expanded to allow communication with more than two networks over the same modem in other embodiments.

Returning to FIG. 1, the wireless modem 20 is in communication with an applications processor 30 and a network attachment arbitrator (NAA) module 32. In one embodiment, the network attachment arbitrator module 32 controls switching between multiple networks, for example between the two networks 12 and 14. In one embodiment, the applications module 30 has a first network application processing module 34 which controls processing of first network data, and a second network application processing module 35 which controls processing of second network data.

In one embodiment, the data processing can involve processing of incoming data received from the respective network to convert the data into a format suitable for presenting to the user of subscriber station 10. In one example, if one of the networks that the subscriber station 10 is in communication with is a bidirectional network, the associated application processing module can also include processing of user data into a format suitable for transmission from the subscriber station 10 over the bidirectional network via modem 20.

In one embodiment, the first network 12 may be a bidirectional wireless communication network, while the second network 14 is a unidirectional network. The first network 12 may be a bidirectional wireless communication network such as a conventional two way WiMAX network as defined by the WiMAX Forum. The WiMAX Forum is a nonprofit organization working to facilitate the deployment of broadband wireless networks based on the Institute of Electrical and Electronics Engineers' IEEE 802.16 and ETSI HiperMAN standards by ensuring the compatibility and interoperability of broadband wireless equipment. As mentioned above, the second network may be a unidirectional network which is based on distribution of Digital Video Broadcasting-Handheld (DVB-H) data over a WiMAX-based wireless distribution unidirectional network for distribution of multimedia content, such as video, to a plurality of subscriber stations.

One advantage of deploying a bidirectional network in the same geographical area as a unidirectional multimedia distribution network is that a subscriber station can be built with an efficient architecture that is capable of communicating with both networks, as described herein.

Figure 2:
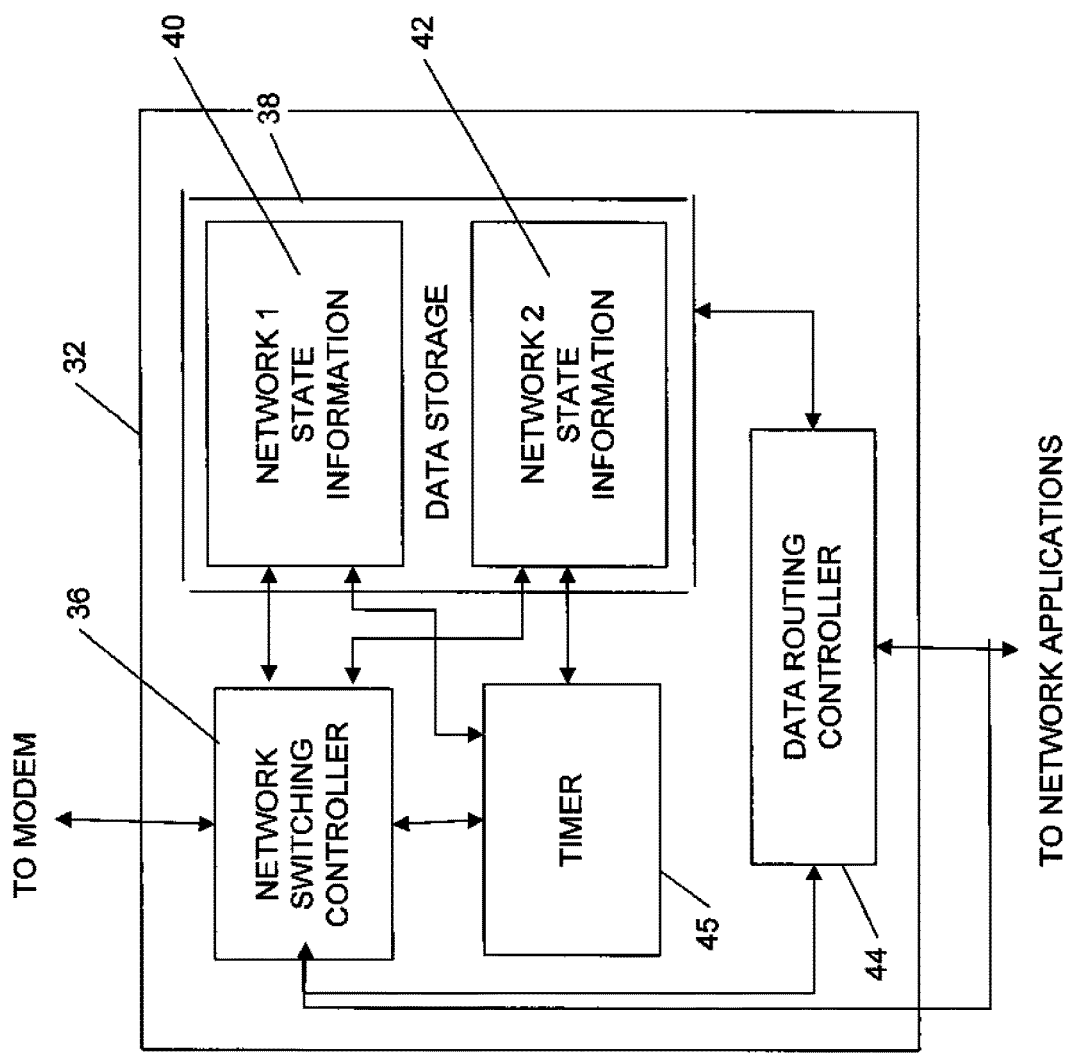
FIG. 2 is a block diagram illustrating the network attachment arbitrator module of FIG. 1 in more detail.
Figure 3:
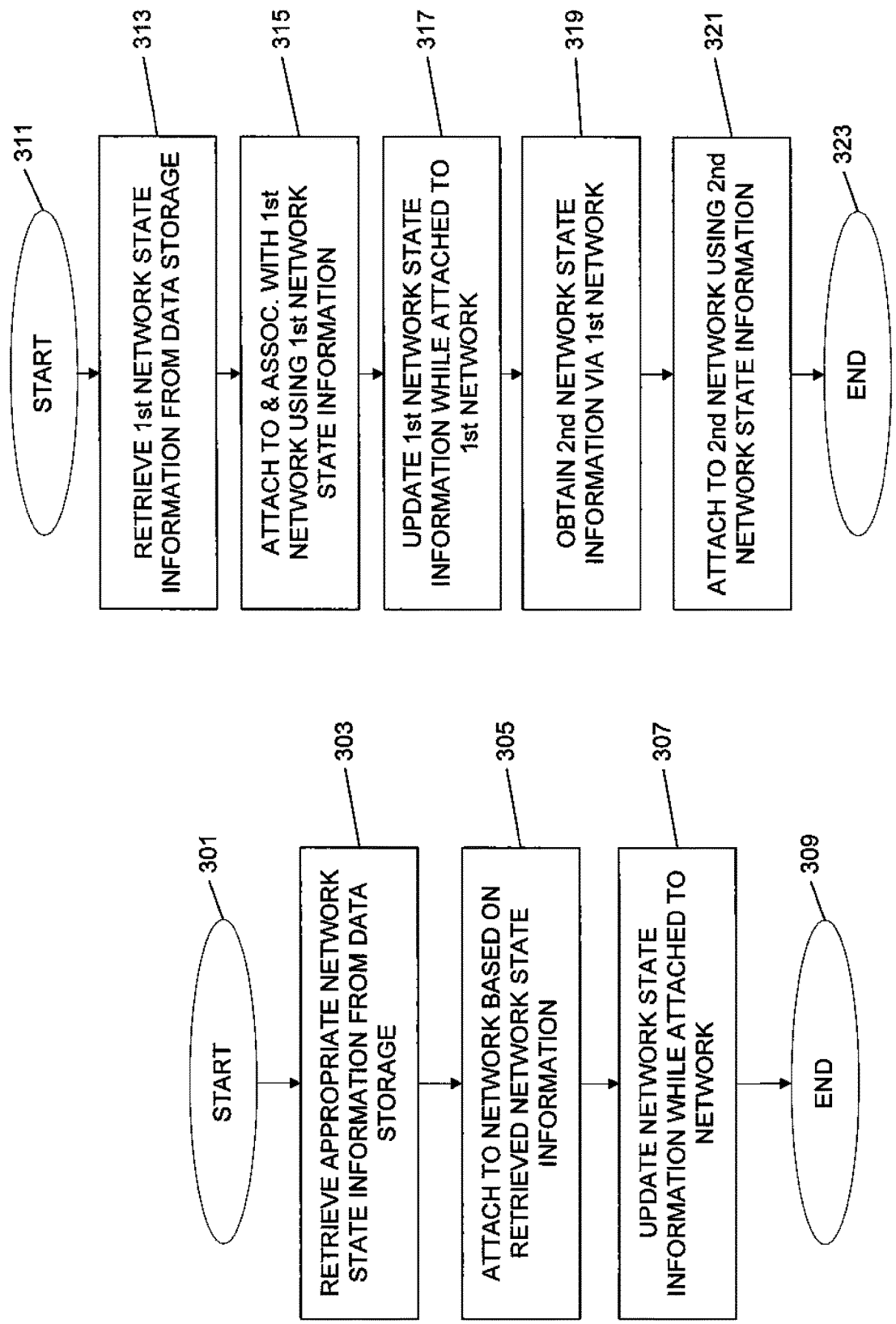
FIG. 3A is a flow diagram illustrating use of network state parameters to associate with and attach to a network according to exemplary embodiments.
FIG. 3B is a flow diagram illustrating use of network state parameters to associate with and attach to multiple networks according to exemplary embodiments.

FIG. 2 is a block diagram illustrating further detail of one embodiment of a network attachment arbitrator module 32. As shown in FIG. 2, the network attachment arbitrator module 32 includes a network switching controller module 36 in communication with the modem 20 (see FIG. 1), data routing controller 44, and data storage module 38. In one embodiment, the data storage module 38 includes a first storage area 40 that stores network state information about the first network 12, and a second storage area 42 that stores network state information about the second network 14. A timer module 45 is in communication with both the network switching controller module 36 and the data storage module 38 to provide timing information timing for use in controlling the switching between networks 12 and 14. Data routing controller 44 provides control of the routing of data between modem 20 and one of network application modules 34 and 35, depending on which one of networks 12 and 14 the network switching controller 36 has directed modem 20 to attach to. In this regard, data routing controller 44 controls the aforementioned data routing in accordance with a network switch signal received from network switching controller 36. Data routing controller 44 is in communication with network application modules 34 and 35 in order to provide them with a control signal to direct the appropriate routing of data between modem 20 and one or the other of network application modules 34 and 35. It can be appreciated that the data storage module 38 may also include other data storage such as NAA module 32 program instructions, operating data and parameters, and the like.

In one embodiment, the state information of the first and second networks 12 and 14, stored in the first and second storage areas 40 and 42, includes information to allow the modem 20 to tune to, synchronize with, and associate with if appropriate, the respective network, whereby subscriber station 10 is able to receive and synchronize with data streams arriving from that network over the associated airlink channel. As mentioned above, an association is a notion of a mutual two-way logical connection with associated state information maintained jointly at the subscriber station and the serving base station of the network to which the subscriber station is associated. In one example, when a subscriber station is attached to a network and registers with a particular base station in that network, an association is formed that includes, but is not limited to, basic capabilities of the subscriber station and the base station, security association, IP addressing, and operational parameters. For example, the state information can include at least one or more of the following information or communication parameters for the respective network:

1. Frequency
2. Timing information (frame number of current frame)
3. Security information (decryption keys)
4. Base station/access point or transmitter identification BSID. The BSID may change as the subscriber station 10 moves into new macro-cell or area covered by a new base station and the stored information is updated as necessary as such changes occur.
5. Connection identifier (CID) for network
6. Expected preamble index
7. Time base offset (network time).

The stored network state information or other communication parameters can be updated as necessary. For example, each time a subscriber station moves within a network, re-attaches to a network or moves into the coverage area of a different network, the state information can be updated.

Additionally, a frame counter may be provided in the timer module 45 that allows the NAA to keep track of the current frame number of a data stream transmitted from a network even when the modem 20 of subscriber station 10 is attached to another network. In this way the current frame number of each network can be stored as part of the network's state information in data storage 38 of NAA module 32. A base station, or access point, identifier in the network state information can also updated when a subscriber station passes from a coverage area of one base station to the coverage area of a different base station.

The network switching controller module 36 can also determine when the subscriber station 10 should attach to a network. For example, the network switching module 36 can determine if the subscriber station 10 should attach to a network based on previously programmed instructions which may be stored in the data storage module 38, incoming signals, user input, or the like, as described in more detail below. The network switching controller module 36 can also provide the associated network state information to the modem 20 when issuing a command to switch from one network to another.

FIG. 3A is a flow diagram illustrating the use of network state information to attach to a network according to exemplary embodiments. A subscriber station is "attached" to a network when an RF module in the subscriber station is tuned to a frequency band used by the network and is synchronized to the arriving waveform so that a PHY module and a MAC module in the subscriber station can receive information from, and transmit information to (if a bidirectional network), the network. Thus, the concept of "attachment" can be viewed as a physical connection of the modem of the subscriber station with the received waveform and does not imply that an "association" has been established between the subscriber station and the network, which can be viewed as a logical connection. In other embodiments, the network, instead of being frequency division based, may be a code division based network or a time division based network, in which case the modem adjusts to a code parameter or a timing parameter to attach to the network.

The subscriber station can be "associated" with a bidirectional network, or be in communication with a unidirectional network, and intermittently switch between the two networks by attaching and detaching from each of the networks in a coordinated fashion. In the following description, a subscriber station "associates" with a bidirectional network with which it intends to communicate. The process of association can vary from network to network. For example, in a typical conventional bidirectional network, a subscriber station is associated with a network when the subscriber station has registered with the network and has negotiated for communication services with the network. A subscriber station typically maintains the association with the bidirectional network until the subscriber station is turned off. The "association" between the subscriber station and the bidirectional network is a two-way logical connection concept and state information for the association can be maintained in both the base station and the subscriber station. When a subscriber station is associated with a bidirectional network, the subscriber station can intermittently attach to and detach from that network without losing its association with the network. Specifically, the association with the bidirectional network is not torn down while the subscriber station is detached from the bidirectional network and is attached to the unidirectional network.

In one embodiment, the subscriber station does not need to associate with the unidirectional network before it attaches to the unidirectional network because there is no uplink in the unidirectional network to support a mutual connection.

Returning to FIG. 3A, flow begins in block 301. Flow continues to block 303 in which appropriate network information for a desired network is retrieved from data storage. Flow continues to block 305 where the subscriber station attaches to the desired network using the retrieved network information. For example, the subscriber station can attach to the desired network by tuning the modem of the subscriber station to the frequency band used by that network and then synchronizing to an arriving waveform from that network so that a PHY module and a MAC module in the subscriber station can receive information over the network Flow then continues to block 307 where the network state information is updated, if needed, while the subscriber station is attached to the network. Additionally, the network state information can be updated in a data storage module upon attachment, while attached, upon detachment or while detached. Flow continues to block 309 and ends.

FIG. 3B is a flow diagram illustrating use of network state information to associate with, and attach to (if appropriate), each of multiple networks according to exemplary embodiments. Flow begins in block 311. Flow continues to block 313 where network state information for a first network is retrieved from data storage. Flow continues to block 315 where the subscriber station attaches to the first network by tuning to and synchronizing with that network using the first network's state information. In the case that the first network is bidirectional, the subscriber station also establishes an association with the first network by, for example, registering with and negotiating for services with the first network. Flow continues to block 317 and the network state information of the first network is updated, if needed, while being attached to that network. Additionally, the network state information can be updated in a data storage module upon attachment, while attached, upon detachment or while detached.

Flow continues to block 319 in which network state information for a second network is obtained via the first network. For example, after the subscriber station has attached to the first network, the subscriber station can receive, or download, network state information related to a second network via the first network. Flow continues to block 321 where the subscriber station detaches from the first network and attaches to the second network using the second network state information obtained via the first network. Flow continues to block 323 where flow ends. In this manner, the subscriber station is prepared in advance for attachment to the second network by having previously obtained the network state information for the second network while the subscriber station is attached to the first network. As an alternative, the second network state information obtained in block 319 may be obtained from a memory or from alternate means.

Figure 4:
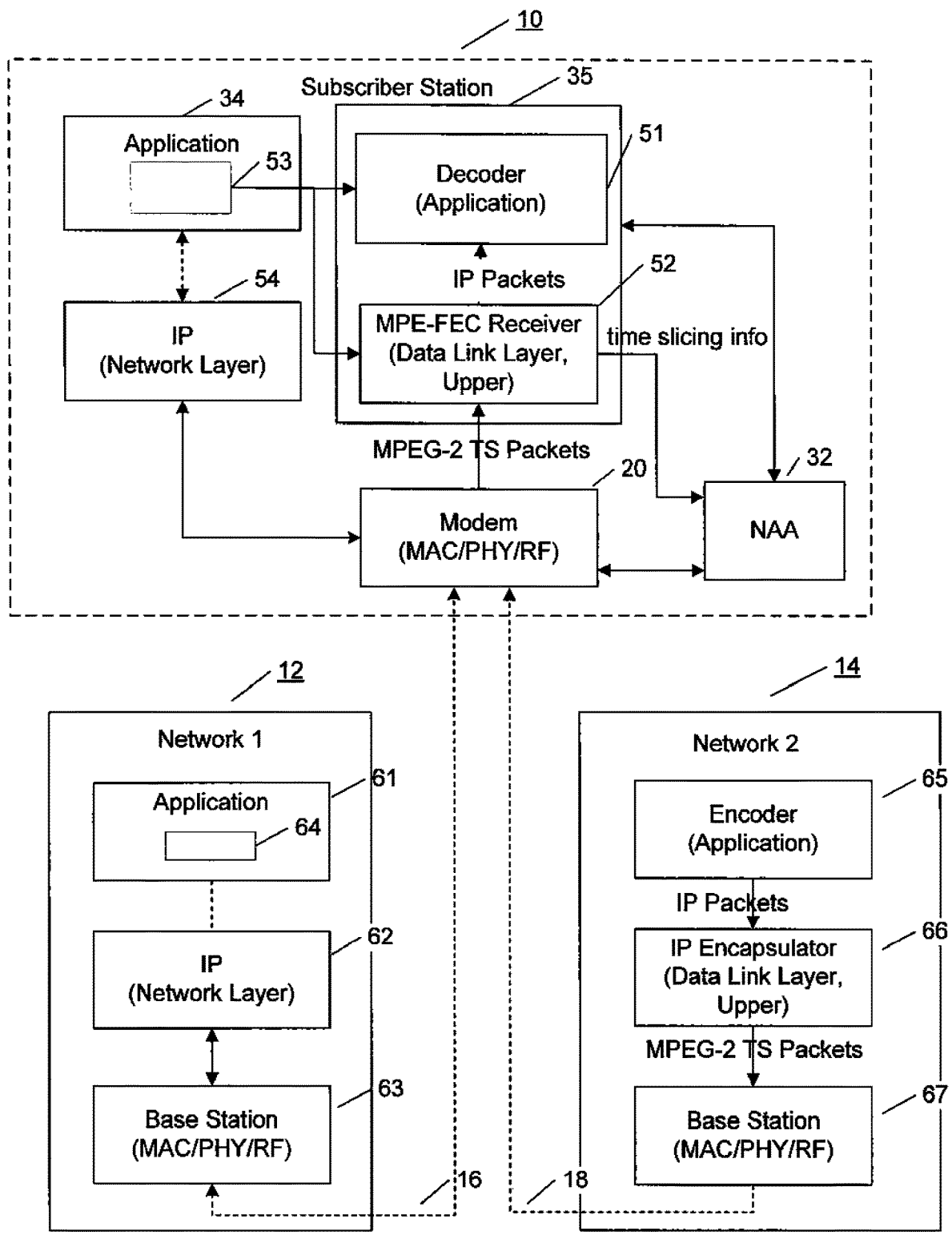
FIG. 4 is a block diagram illustrating an exemplary embodiment of the system of FIG. 1 for utilization of two networks by a subscriber station.

FIG. 4 is a block diagram illustrating further detail of an exemplary embodiment of the system of FIG. 1 for utilization of two networks by a subscriber station. FIG. 4 includes further detail of subscriber station 10 and of first and second networks 12 and 14. As shown in FIG. 4, the subscriber station 10 includes first network application module 34 and second network application module 35, in which the second network application processor 35 includes an application layer decoder module 51 and a data link layer module 52, such as a multiprotocol encapsulator forward error correction (MPE-FEC) receiver which receives TS packets from modem 20. The first application module 34 is in communication with a network layer module 54, such as an IP network layer module which is in communication with modem 20 to receive and send data packets. First application module 34 can include various types of applications, such as content meta information modules 53 shown in FIG. 4 which obtains meta information regarding content distributed over a network, such as network 14.

As illustrated in FIG. 4, the first and second network application processors 34 and 35 communicate with a modem 20 which can be in communication with the first or second networks 12 and 14, respectively. The modem 20 can transmit and receive data from the first and second networks 12 and 14 over wireless communication links 16 and 18. Subscriber station 10 further includes network attachment arbitrator 32, which as discussed herein is used to control modem 20 to switch between networks 12 and 14. In one embodiment, the first network 12 is a bidirectional network and the second network 14 is a unidirectional network.

In some embodiments, it is possible that some of the modules or layers shown within subscriber station 10 in FIG. 4, for example the modem 20, can be implemented in the subscriber station 10 while the other modules or layers, such as the application layer decoder module 51 and the data link layer module 52, can be implemented in a device to which the subscriber station is connected.

In the embodiment depicted in FIG. 4, the second network 14 is a unidirectional network and first network 12 is a bidirectional network. The second network 14 is used to distribute multimedia content to multiple subscriber stations and includes an application encoder module 65 that provides internet protocol (IP) packets of content to an IP encapsulator module 66. The IP encapsulator 66 is located at the top of a data link layer, encapsulating IP packets with an outer channel code and with time interleaving information and then communicating the resultant MPEG-2 transport stream (TS) packets to a transmit module 67 located in a base station. An air interface protocol governs the operation of transmit module 67 and a receive module at modem 20. Transmit module 67 includes a MAC module, a PHY module and an RF module, wherein the MAC module receives the TS packets from IP encapsulator module 66 and forwards them to the PHY module which processes them for transmission and sends them to the RF module for transmission over the network. Data transmitted from the transmit module 67 to the modem 20 via the air interface channel 18 can be included in one or more frames.

The modem 20, which also includes MAC, PHY and RF modules, outputs the data received as MPEG-2 TS packets from network 14 to the second network application module 35, whereupon the data link layer module 52 receives the MPEG-2 TS packets and outputs IP packets to the application decoder module 51 which decodes the packets for use by the subscriber station, such as in video playback. In data link layer module 52, the multiprotocol encapsulation with forward error correction (MPE-FEC) receiver can extract time interleaving information and provide an input based upon this information to the receiver at modem 20 and to the network attachment arbitrator (NAA) module 32. Aspects of the time interleaving information, referred to as "time slicing," are described further below in connection with FIGS. 6, 7, and 8.

In one embodiment, the unidirectional network 14 can transmit multiple content streams that have been accumulated into an aggregate interleaved content stream. Once the application decoder module 51 has synchronized to the IP streams received from data link layer module 52, it can select one or more content streams to extract for storage or for display to the user. The content streams can include, for example, movies, games, audio broadcast, broadcast television programs, or other multimedia data.

When subscriber station 10 is attached to bidirectional network 12, the first network application module 34 can communicate with a network layer module 54, for example, by transmitting and receiving IP packets to and from network layer module 54. The network layer module 54 is also in communication with the MAC layer of modem 20 which can transfer data to and from the first application processor 34.

The first network 12 can include application modules 61, a network layer module 62 and a transceiver module 63 in a base station. Transceiver module 63 includes MAC, PHY and RF modules. In one embodiment, the application modules 61 in the first network 12, include various applications such as content meta information servers 64 that provide information to the content meta information module 53 in the first application processor 34 of subscriber station 10. The application modules 61 do not need to be co-located with the other modules of the first network 12. For example, application modules 61 can be operating on a processor or server in another network, such as the Internet, that is in communication with the network layer module 62 of first network 12, and can include applications such as VoIP, IM, email, etc.

The content meta information obtained from content meta information servers 64 can provide information about a network, such as unidirectional network 14. In this manner, meta information about the unidirectional network 14 and the content distributed thereon can be retrieved from the bidirectional network 12.

In one embodiment in which subscriber station 10 is attached to the bidirectional network 14, the content meta information module 53 can retrieve content meta information about network 12 from content meta information servers 64. The content meta information module 53 is in direct or indirect communication with the application decoder module 51 and the data link layer MPE-FEC receiver module 52 and provides them with content meta information about the second network, such as an electronic service guide (ESG), program specific information (PSI), and other such information related to the content distributed on unidirectional network 14.

In one embodiment, the content meta information module 53 can receive content meta information via first network 12 about the timing, or occurrence, of events such as broadcast video programs on the second network. In another embodiment, the first application module 34 can receive network state information via first network 12 about second network 14.

In another embodiment, content meta information about what content is included in a transmission of a unidirectional network, such as the second network 14, can be received via first network 12, or from the signal received from the second network 14. For example, an electronic service guide (ESG) can be communicated to the subscriber station 10 via first network 12 or second network 14. In one embodiment, an ESG is a displayed on-screen guide of scheduled broadcast programs which allows a viewer to navigate through the guide, discover and select content by time, title, channel, genre, etc. In one embodiment, when an ESG is provided to a subscriber station, such as a subscriber station that is connected to personal media player (PMP), the guide enables a viewer to record broadcast programs received and extracted from the signal of the unidirectional network for later viewing. Typical elements of an ESG comprise a graphical user interface which can enable the display of program titles, descriptive information such as a synopsis, actors, directors, year of production, and other information.

ESG information data is typically sent within the unidirectional transmission of content transport packets, or alongside the transmission of the content packets in a special data channel within the unidirectional network at a very low data rate. The date rate for the transmission of the ESG in such a unidirectional network is kept low so that transmission of the ESG and other meta data needed by the subscriber station to access content from the unidirectional network does not consume an excessive amount of the system capacity. However, the low transmission rate introduces a delay when a subscriber station is initialized and the ESG data is slowly accumulated by the subscriber station over the unidirectional network. Accordingly, it may be preferable in some embodiments for the subscriber station to obtain the ESG information over bidirectional network 12 from content meta information servers 64 in response to a query from content meta information module 53.

In addition to ESG, other content meta information may be sent at a low data rate over the unidirectional network. For example, Program Specific Information (PSI) can be sent over the unidirectional network. PSI is metadata that is defined by the MPEG-2 standards. The PSI data can contain many tables, including the following: PAT (Program Association Table), CAT (Conditional Access Table), PMT (Program Map Table) and NIT (Network Information Table). This information can be used by the subscriber station to map a particular program to its associated component data streams (video, audio, etc) and also to map to an IP address to each component data stream.

As noted, content meta information about the unidirectional network signal can be included in the unidirectional signal itself, or it can be received from a different network, such as bidirectional network 14. For example, as discussed above with respect to FIG. 3, information about the unidirectional network 14 signal can be can be received by the subscriber station 10 from the unidirectional network 14 itself, of from a bidirectional network 12.

The data streams transmitted through airlink channel 16 between the first network 12 and subscriber station 10 may be provided in various formats, such as audio, stored data files, meta-data, motion picture expert group-2 (MPEG-2), Windows Media Video, and other formats, and the first network applications module 34 may be adapted to receive and process the various different types of content in a manner known in the field. The subscriber station 10 can perform many functions when attached to either network, for example, it searches for the other respective network when it is time to attach to that other network, it receives and de-capsulates PDUs, it scans for and performs handover to adjacent networks, and if appropriate, it consumes MAC management messages received from a base station of the network.

Figure 5:
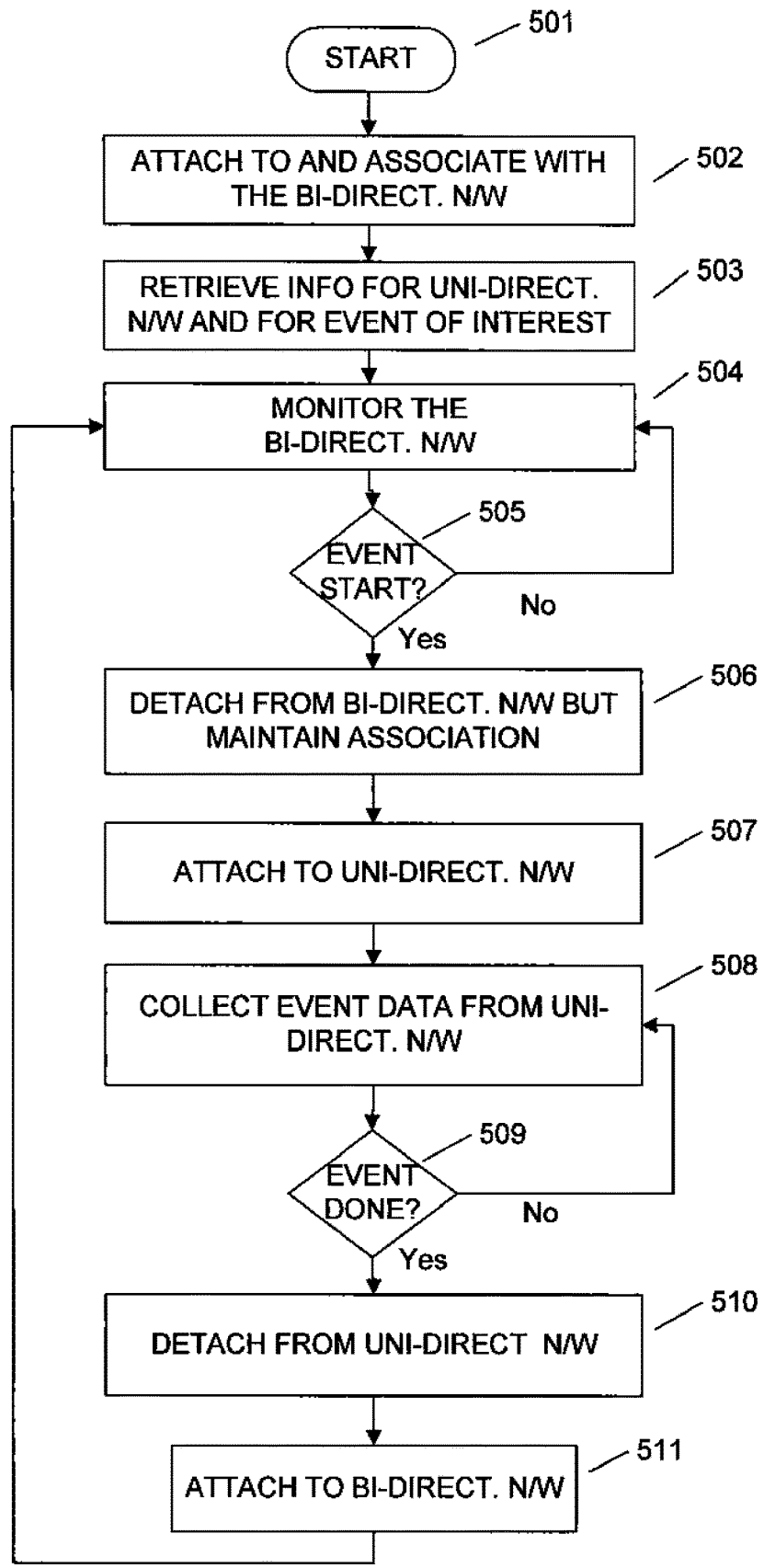
FIG. 5 is a flow diagram of an exemplary embodiment of a network switching method for switching between a bidirectional network and a unidirectional network.

FIG. 5 is a flow diagram of an exemplary embodiment of a network switching method for switching between multiple networks. In the embodiment depicted in FIG. 5, a subscriber station switches between two networks using a single modem, wherein the first network is a bidirectional network and the second network is a unidirectional network, as in the system described above with respect to FIGS. 1 to 4. Of course, the present disclosure also applies to other various combinations of unidirectional and/or bidirectional networks. In the embodiment illustrated in FIG. 5, which may be described as "dedicated mode", flow begins in block 501. Flow continues to block 502 and a subscriber station attaches itself to and associates with the bidirectional network. In one embodiment, the first network may be a bidirectional network 12. Network state information for the bidirectional network can be stored and periodically updated while the subscriber station 10 is attached to the bidirectional network. In one embodiment, the bidirectional network may be a two-way WiMAX network.

Flow continues to block 503. In block 503 the subscriber station 10 retrieves network state information about a unidirectional network, such as a DVB-H over WiMAX broadcast unidirectional network as described above. The information retrieved can include network state information of the unidirectional network, as well as content meta information about events of interest and the timing of events on the unidirectional network. In one embodiment, the subscriber station 10 retrieves information about the unidirectional network from the bidirectional network. In another embodiment, the subscriber station 10 retrieves information about the unidirectional network from the unidirectional network itself. Flow continues to block 504 and the subscriber station 10 remains attached to, and monitors or utilizes services of, the bidirectional network.

Flow continues to block 505 where it is determined if a desired event, such as a broadcast TV program, is about to start on the unidirectional network that the subscriber station 10 desires to receive, as indicated for example by a user selection of a content item from an electronic service guide (ESG) displayed on subscriber station 10. For example, if there is a particular stream of desired content, it is determined if that particular content stream is about to be transmitted over the unidirectional network based on previously obtained content meta information associated with the unidirectional network. If it is determined in block 505 that a desired event is not about to start, then flow returns to block 504 and the subscriber station continues to monitor the bidirectional network. If, in block 505, it is determined that a desired event is about to start, flow continues to block 506 in which the subscriber station 10 detaches itself from the bidirectional network. Although the subscriber station 10 detaches from the bidirectional network, the subscriber station 10 maintains its established association with the bidirectional network.

Flow continues to block 507 in which the subscriber station 10 attaches to the unidirectional network. Flow then continues to block 508 in which the subscriber station 10 collects data associated with the desired event, such as video data formatted in MPEG-2 TS data packets, while attached to the unidirectional network. Flow continues to block 509 where it is determined if the desired event is done (completed). If it is determined in block 509 that the desired event is not done, flow returns to block 508 and the subscriber station 10 continues to collect more data associated with the desired event. In this manner, the subscriber station stays attached to the unidirectional network in a dedicated fashion until all of the data is collected for the desired event. If in block 509 it is determined that the desired event is done, then flow continues to block 510.

In block 510 the subscriber station 10 detaches from the unidirectional network, and flow continues to block 511. In block 511, the subscriber station 10 attaches again to the bidirectional network with which it already has an established association. Flow then returns to block 504 and the subscriber station 10 monitors the bidirectional network until such time as another desired event is about to begin on the unidirectional network.

In one embodiment, desired content "event" can be a broadcast, such as a video data stream. An event has a start time and a complete time and it is possible that two events can overlap in time if the event data is interleaved. If a subscriber station 10 is receiving two or more events, the conclusion of one event does not necessarily imply that the other events have concluded. In one embodiment, an event has a duty cycle, ranging between 1 and 100. If time slicing (interleaving of content data) is not being employed in the unidirectional network, then the duty cycle of an event is 100 and events cannot overlap. If an event has a duty cycle of less than 100, then time slicing is being employed. In one embodiment, events are continuously being transmitted over the unidirectional network.

Figure 6:
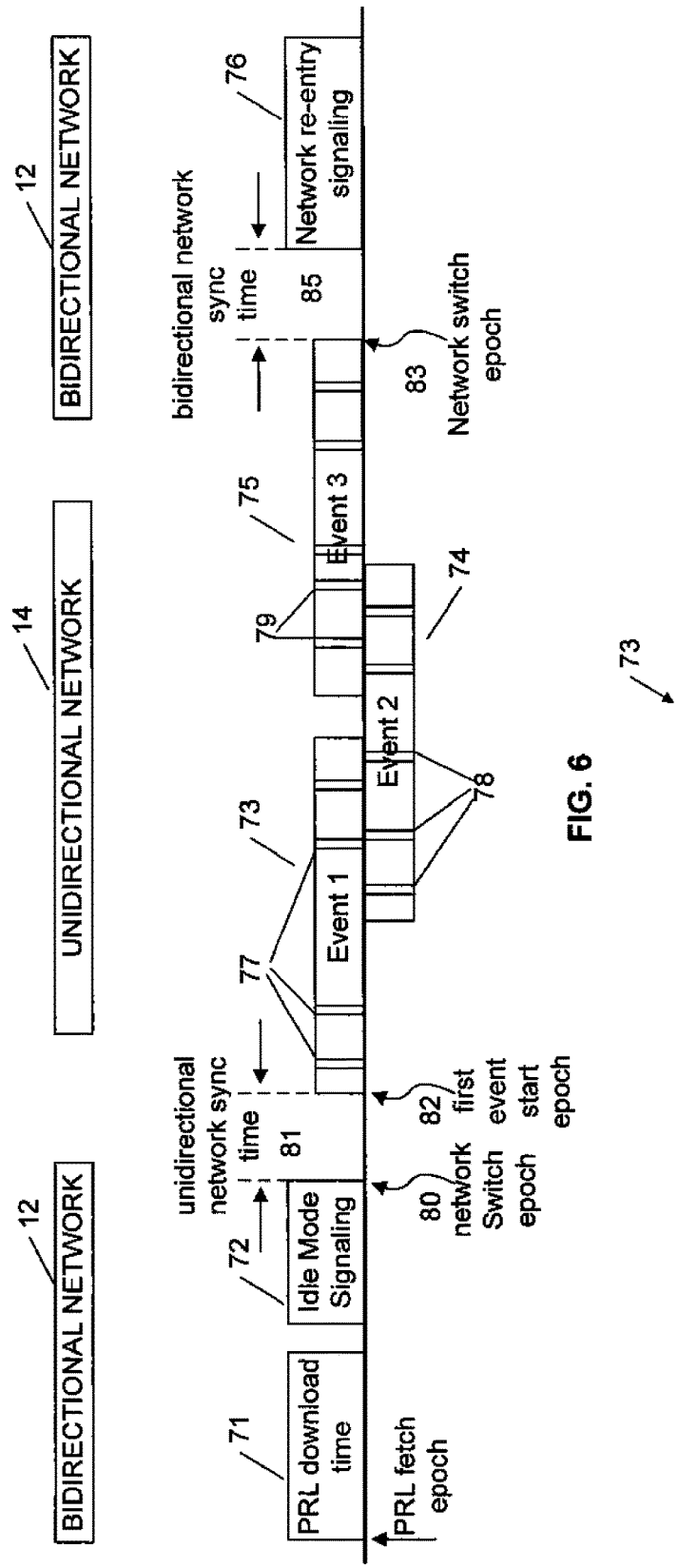
FIG. 6 is a network switching time line according to an exemplary embodiment.
Figure 7:
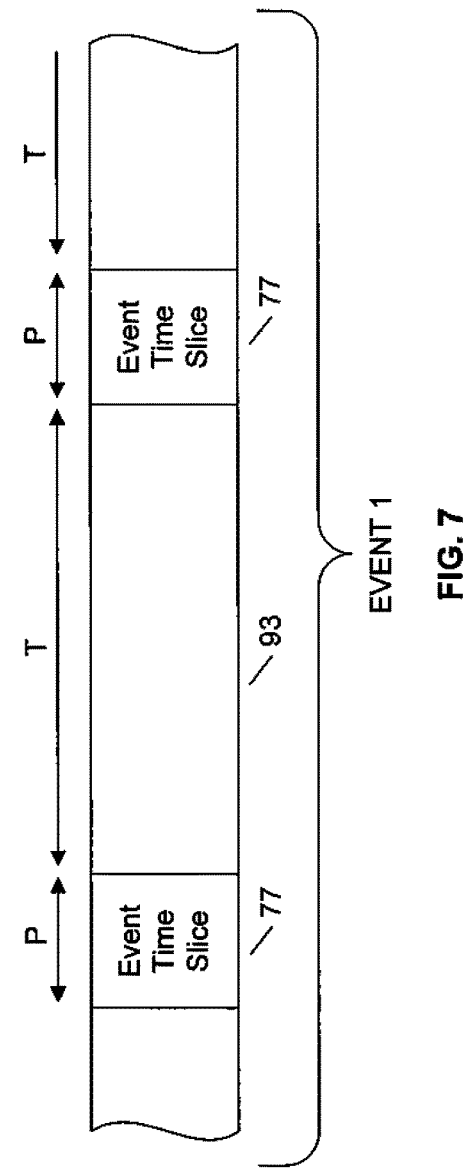
FIG. 7 is an enlarged view illustrating time sliced broadcast data according to an event shown in FIG. 6.

FIG. 6 is a network switching time line according to an exemplary embodiment. In the embodiment illustrated in FIG. 6, a unidirectional network transmits interleaved event data packets for three events 73, 74, and 75 selected for download at the subscriber station 10. Each of events 73, 74 and 75 comprises a series time slices of data packets 77, 78, and 79 with appropriate headers identifying the event, separated by time slices 93 during which the desired event packets are not being transmitted, as illustrated for one event in FIG. 7. As shown in FIG. 7, an event 73 includes time slices 77 when event data packets for event 73 are being transmitted, where event data time slices 77 are separated by time slices 93 when data packets associated with the event 73 are not being transmitted. During the time slices 93 of event 73, data packets for other events may be transmitted in an interleaved fashion, as depicted in the three events 73, 74 and 75 of FIG. 6.

The subscriber station 10 collects content meta information for one or more desired events while subscriber station 10 is attached to one of the two networks. For example, the subscriber station 10 can collect content meta information about one or more events that are going to occur on a unidirectional network while subscriber station 10 is attached to the bidirectional network, as described above with respect to FIG. 3B.

In a mode referred to as a dedicated mode, such as described above with respect to FIG. 5, the subscriber station 10 remains attached to the unidirectional network upon which the desired event is occurring until the conclusion of the desired event. For example, if the subscriber station 10 is schedule to receive the three events 73, 74, and 75 in FIG. 6, the subscriber station 10 remains attached to the unidirectional network until the conclusion of the final event, in this case event 75. In this example, when the final event, event 75, is complete, the subscriber station 10 detaches from the unidirectional network, and again attaches to the bidirectional network, and remains attached to the bidirectional network until a designated time prior to the start of a next desired event on the unidirectional network, or until the subscriber station 10 is disconnected or powered off. In this dedicated mode embodiment, the subscriber station 10 remains attached to the bidirectional network, when present, unless a desired event is occurring on the unidirectional network in which case the subscriber station 10 will attach to the unidirectional network and remain attached to the unidirectional network while receiving and collecting data of the desired event until completion of that event.

In one embodiment, the subscriber station 10 is configured to download electronic service guide (ESG) information for content on the unidirectional network from an ESG server when subscriber station 10 powers on and attaches to the bidirectional network. When submitting an ESG query to the ESG server, the subscriber station 10 can include the base station identifier (BSID) of its serving base station on the bidirectional network. This can be used to identify the unidirectional network in which the subscriber station 10 is currently located. The ESG describes the events which are available or will be available in the future on the unidirectional network in which the subscriber station 10 is located. The subscriber station 10 may also download, during the same exchange over the bidirectional network, the relevant MPEG-2 program specific information (PSI) tables for the unidirectional network in which subscriber station 10 is located. The MPEG-2 PSI describes the parameters of the unidirectional network, describes the elementary streams present in the broadcast, and maps IP addresses to MPEG-2 packet identifiers (PID). In one embodiment, this information can be stored as part of the second network state information 42 in the NAA data storage module 38. The user may select desired events for download from the ESG. Subscriber station 10 remains attached to the bidirectional network until the start epoch of a desired event on the unidirectional network.

The ESG may also be available on an IP stream within the unidirectional network 14 and the MPEG-2 PSI may be available on well known elementary streams, and the subscriber station 10 may alternatively obtain the ESG and PSI from these sources. However, obtaining this information via the bidirectional network can accelerate the synchronization time of the subscriber station 10 when it attaches to the unidirectional network. The subscriber station 10 knows the IP address of all desired events on the unidirectional network via the ESG, and can find and filter for desired events using the IP address to program ID (PID) map provided in the PSI. The ESG and MPEG-2 PSI can also be transmitted at a low rate over the unidirectional network in the event that a subscriber station 10 enters the unidirectional network without first attaching to and associating with a bidirectional network. The format of the ESG is the same regardless of whether it is obtained via download or via a time sliced IP stream, and the ESG may be an extensible markup language (XML) file with a well understood namespace.

If the bidirectional network is not present, either because it does not exist or is out of range or is lost while the subscriber station 10 is attached, the subscriber station 10 searches for and attaches to the unidirectional network by, for example, using the methods described in co-pending application Ser. No. 11/6233,032, referenced above. Once attached to the unidirectional network, the subscriber station 10 searches for a bidirectional network at times orthogonal to desired events on the unidirectional network, using standard methods for search, attachment to and association with a bidirectional network. Geo-location information provided by the unidirectional network may be used to narrow the search for a bidirectional network.

Returning to FIG. 6, at a predetermined period of time before the start epoch 82 of a desired event, but before the subscriber station has detached from the bidirectional network, the subscriber station 10 generates a query over the bidirectional network for network information associated with the unidirectional network, such as a unidirectional network preferred roaming list (PRL) query to a PRL server as depicted in FIG. 6, or a query to another server for other useful information about the unidirectional network, such as neighbor network information and the like. The BSID of the current serving base station in the bidirectional network can be included in this query to facilitate identification of a unidirectional network in which subscriber station 10 is located. The PRL query produces a downloaded PRL 71 which can be used to accelerate the search process for a unidirectional network. Prior to the first event start epoch 82, the PRL 71 is downloaded. After the PRL download 71, or after the download of other unidirectional network information via the bidirectional network, there is an idle signaling mode period 72. The subscriber station can remain in the idle mode 72 until a network switch epoch 80 occurs. The network switch epoch 80 occurs a sufficient time period 81 before the first event start epoch 82 to allow the subscriber station 10 enough time to attach to the unidirectional network. The subscriber station 10 will then collect desired event data until all desired events are completed, at which point a next network switch epoch 83 occurs. During a time period 85 following the network switch epoch 83, the subscriber station 10 will attach to the bidirectional network. After the subscriber station has attached to the bidirectional network, a network re-entry signaling period 76 is entered.

In one embodiment, if the subscriber station 10 is not already in idle mode when detaching itself from the bidirectional network, it sends a deregistration request (DREG-REQ) message to the base station of the bidirectional network which replies with a deregistration command DREG-CMD containing paging parameters. These paging parameters are not relevant to the subscriber station 10 at this point because the subscriber station 10 does not respond to pages while it is detached from the bidirectional network and attached to the unidirectional network. However, from the bidirectional network's perspective, it does not know if the subscriber station 10 is entering an idle mode for power savings or if it is entering an idle mode in order for the subscriber station to switch networks, and therefore the bidirectional network sends paging parameters as usual. If the unidirectional network PRL was just downloaded to the subscriber station 10, most likely the subscriber station 10 is not in idle mode. If the unidirectional network PRL download was not recently downloaded by the subscriber station 10, then most likely the subscriber station 10 is already in idle mode and can simply detach from the bidirectional network upon the start of a desired event on the unidirectional network.

The process of searching for and attaching to a unidirectional network according to one embodiment is described in detail in U.S. patent application Ser. No. 11/623,032, referenced above. Using the ESG and PSI information, the subscriber station 10 receives and extracts the IP packets for the desired event(s) from the unidirectional network. The subscriber station can be configured to conserve power by directing the receiver to turn "off" during slices of time when the desired event's packets are not being transmitted on the unidirectional network (i.e. when packets are arriving which belong to undesired events). If another overlapping desired event(s) starts while the current desired event is in progress, the subscriber station receives and collects data for all desired events by adjusting the time slicing duty cycle and receiving the appropriate IP packets for the desired events.

Both the ESG and the PRL may be fetched using trivial file transfer protocol (TFTP). The subscriber station 10 obtains the ESG and PRL information from ESG and PRL servers which have IP addresses which may be known to the subscriber station. Alternatively, the IP addresses are received by means of a domain name system (DNS) query or an ESG/PRL query from the subscriber station via the bidirectional network.

Upon the conclusion of a desired event, if there are no more ongoing desired events, the subscriber station 10 detaches itself from the unidirectional network and reattaches itself to the bidirectional network, as indicated in FIG. 6. When reattaching to the bidirectional network, the subscriber station 10 follows the operations defined for transitioning into normal mode from idle mode. For example, this process can involve a ranging request/ranging response (RNG-REQ/RNG-RSP) exchange between the subscriber station 10 and base station of the bidirectional network.

The frequency of ESG download to the subscriber station 10 depends upon the dynamic nature of the broadcast network's programming, the degree to which the ESG projects into the future, and upon the mobility of the subscriber station 10. While attached to the bidirectional network, if the subscriber station 10 roams into a new unidirectional network, the subscriber station 10 downloads the ESG and PSI for this new unidirectional network. The subscriber station 10 recognizes that it is in a new unidirectional network by the BSID of a new serving base station in the bidirectional network. The subscriber station 10 can relate the BSID of the bidirectional network to an associated unidirectional network using a mapping table or by received data, or in any suitable manner. The new BSIDs of the bidirectional network and the unidirectional network can be stored in the first network state information 40 and second network state information 42 of data storage module 38. Before the commencement of a new event, the subscriber station 10 downloads the unidirectional network PRL only if the serving BSID of the bidirectional network has changed.

In one embodiment, to facilitate dedicated mode for collecting desired event data as described above, an idle mode 72, such as that defined in the standard of IEEE 802.16e, may be utilized. A subscriber station can enter idle mode 72 by sending a MAC management message to the base station in the bidirectional network and then receiving a confirmation which includes a paging group to which the subscriber station belongs and other relevant paging information. Idle mode 72 can be used upon the commencement of a desired event on the unidirectional network (during which the subscriber station is detached from the bidirectional network) or when the subscriber station wishes to conserve power but not detach from the bidirectional network.

When entering idle mode 72 in the bidirectional network for the purposes of power savings, the subscriber station awakes during its paging listening interval and responds to all pages on the bidirectional network. The subscriber station also sends location update messages within its idle mode timer. When entering idle mode 72 for the purpose of receiving a desired event over the unidirectional network, the subscriber station does not attempt to reattach to the bidirectional network for page listening or for transmission of location update messages.

When the subscriber station associates with a base station serving the bidirectional network, it indicates that it is a broadcast capable device, indicating to the base station that the logical connection or registration association should not be torn down even if the subscriber station becomes detached from the bidirectional network. The subscriber station may indicate that it is broadcast capable in any suitable manner, for example by means of a type length value (TLV) message within the basic capabilities exchange during the establishment of the association with the bidirectional network. When a subscriber station detaches from the bidirectional network and attaches to a unidirectional network, it does not respond to pages or send periodic location update messages on the bidirectional network. Upon expiry of an idle mode system timer or upon the paging retry count decreasing to zero at the serving base station of the bidirectional network (i.e. the subscriber station is not responding to pages), the subscriber station's associated service and operational information retained for idle mode management purposes at the base station are discarded, but the subscriber station does not discard its association data or disassociate from the bidirectional network. A meta-timer may be provided at the base station of the bidirectional network, for the case where the subscriber station has detached from the bidirectional network for a long time period, which may be on the order of tens of minutes to hours. Upon expiry of this meta timer, the subscriber station is disassociated by the bidirectional network.

Figure 8:
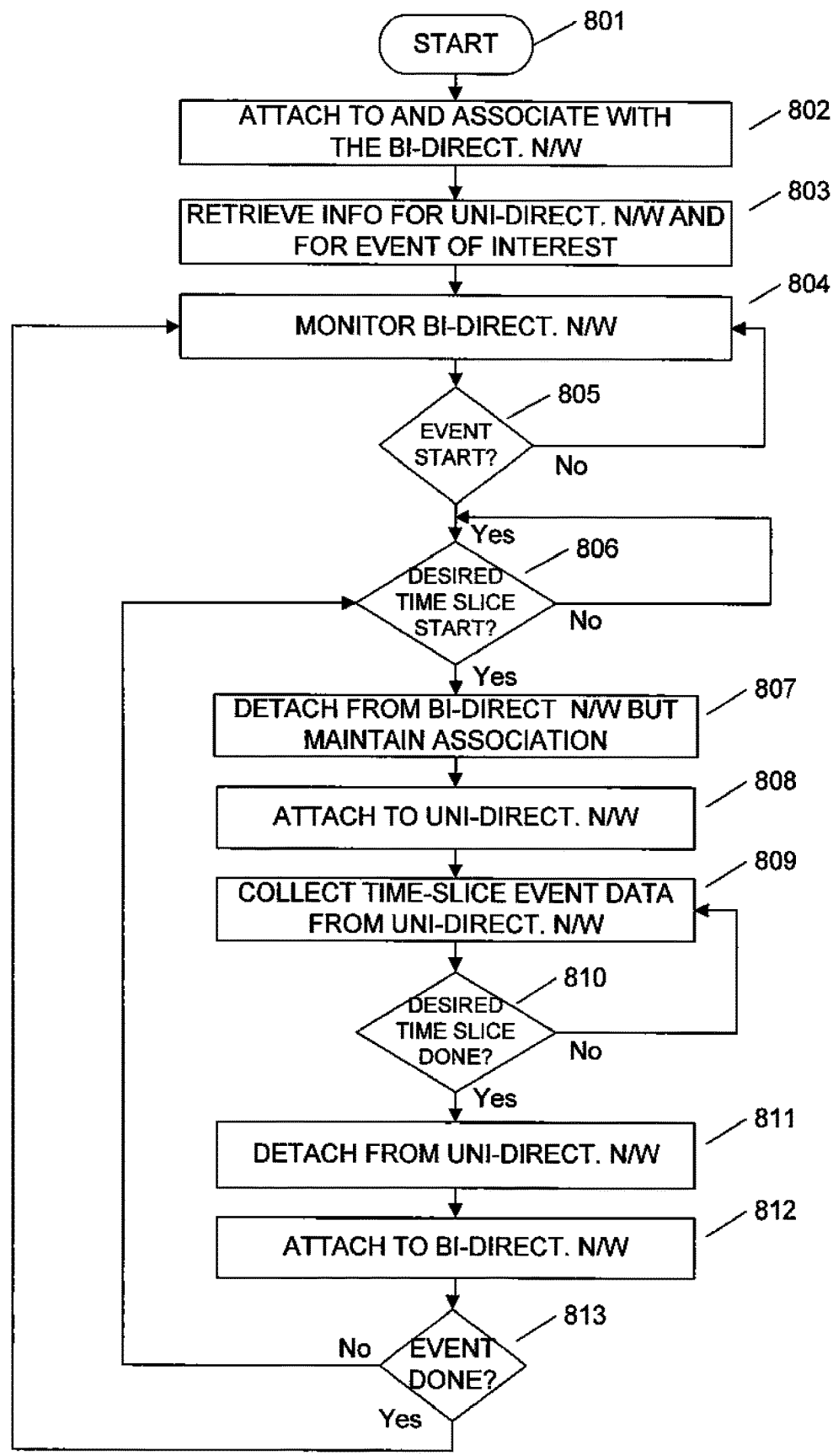
FIG. 8 is a flow diagram of an alternative exemplary embodiment of a network switching method using time slicing data for switching between a bidirectional network and a unidirectional network.

FIG. 8 illustrates an alternative embodiment in which a "toggle" mode or method is used for switching between two networks, such as between a bidirectional network and a unidirectional network, in order to receive desired events broadcast by the unidirectional network. In one embodiment, the subscriber station toggles between the unidirectional network and the bidirectional network during one or more desired events, rather than staying dedicatedly attached to the unidirectional network during the whole time duration of the desired events. In an embodiment implementing DVB-H to broadcast multimedia content over the unidirectional network, the toggle mode is made possible by DVB-H time slicing. In this toggle mode, the time periods in which the subscriber station is detached from the bidirectional network are much shorter than that of the dedicated mode as described above with respect to FIG. 5. In the embodiment depicted in FIG. 8, the subscriber station toggles between two networks, the first of which is a bidirectional network and the second of which is a unidirectional network. Of course, the embodiment of the invention depicted in FIG. 8 can also be implemented with other combinations of unidirectional and/or bidirectional networks.

The flow of FIG. 8 starts in block 801. Flow then continues to block 802 where the subscriber station attaches to and associates with a bidirectional network. Flow then continues to block 803 where information about a unidirectional network is retrieved and information corresponding to a selected desired event on the unidirectional network is also retrieved. In one embodiment, the subscriber station retrieves this information in block 803 via the bidirectional network. The information retrieved can include network state information, including parameters, for the unidirectional network, as well as content meta information about events, and the timing of events, on the unidirectional network. In another embodiment, the subscriber station 10 retrieves the information about the unidirectional network in block 803 from the unidirectional network itself by collecting such information after attaching to the unidirectional network.

In one embodiment, in block 803, the subscriber station retrieves information about the unidirectional network and also about a desired event, such as information obtained from a user input in association with a selected content program listed in an electronic service guide (ESG) displayed at the subscriber station. In an embodiment, the subscriber station attaches to the unidirectional network and retrieves programming information transmitted at a low rate over the unidirectional network. In another embodiment, the subscriber station retrieves the programming information over the bidirectional networking, such as using the content meta information module 53 of FIG. 4. In one embodiment, the subscriber station device presents the program information to a user, such as in the form an ESG, and the user indicates to the subscriber station a desired event.

Flow continues to block 804 in which the subscriber station 10 remains attached to, and monitors, the bidirectional network. While monitoring the bidirectional network, the subscriber station may episodically detach from and re-attach to the bidirectional network, such as, for example, due to entering a sleep mode to conserve power.

Flow continues to block 805 where it is determined if a desired event is about to start on the unidirectional network. For example, if there is a particular content stream associated with a program that a user of the subscriber station 10 wants to receive, it is determined if that particular content stream is about to be transmitted over the unidirectional network. If it is determined that a desired event is not about to start on the unidirectional network, flow returns to block 804 and the subscriber station continues to monitor the bidirectional network. If, in block 805, it is determined that a desired event is about to start, flow continues to block 806.

In block 806, it is determined if a desired time slice of event data is about to start within the desired event on the unidirectional network. If the desired time slice is not about to start, flow remains in block 805. If, in block 805, it is determined that a desired time slice is about to start, flow continues to block 807. Referring to FIG. 7, data of an event 73 is divided into time slices 77 in which portions of the event data is transmitted. Event data time slices 77 are separated by time slices 93 during which there is no event data transmitted that is associated with event 73. If it is desired to receive the event 73 illustrated in FIG. 7, then in block 806 it is determined if a desired event time slice 77 is about to start. If desired event time slice 77 is about to start, flow continues to block 807.

In block 807, the subscriber station detaches from the bidirectional network, but maintains an association with the bidirectional network. Flow continues to block 808 and the subscriber station attaches to the unidirectional network. Flow continues to block 809 and event time slice data is collected during the desired event time slice transmitted from the unidirectional network. Flow then continues to block 810 where it is determined if the desired time slice is done. If the desired time slice is not done, flow returns to block 809 and more desired event time slice data is collected. If, in block 810, it is determined that the desired event time slice is done, flow continues to block 811. Referring to FIG. 7, if the subscriber station was receiving data from the first time slice event 77, in block 810 the subscriber station determines if the first time slice event 77 is done. If it is determined that the first time slice event 77 is not done, meaning there is more data remaining to be received in the slice, the subscriber station continues to receive the desired event data in block 809. If it is determined that the desired time slice event 77 is done, meaning that there is no more event data associated with the desired event that will be transmitted until the start of the next event time slice 77 (after an interval time slice 93), then flow continues to block 811.

In block 811, the subscriber station detaches from the unidirectional network. Flow continues to block 812 and the subscriber station attaches to the bidirectional network with which an association is already established. Flow then continues to block 813 in which it is determined if the desired event is done. In other words, it is determined if all of the event data associated with the desired event has been collected. If, in block 813, it is determined that the event is not done, then flow returns to block 806 and the subscriber station waits for the occurrence of the next desired event time slice. Returning to block 813, if it is determined that the event is done, flow continues to block 804 and the subscriber station monitors the bidirectional network until such time as the next desired event is about to start on the unidirectional network.

Referring to FIG. 6, if in block 813 it is determined that the desired event, for example the first event 73, is not completed, meaning that there is still data associated with the first event that has not been collected, then flow continues to block 806 and the subscriber station waits for the next time slice of first event 73, such as time slice 77 of FIG. 7. If, in block 813 it is determined that the desired event, such as the first event 73, is completed, then flow returns to block 804 and the subscriber station waits for the next desired event.

The toggle mode technique depicted in FIG. 8 allows for the subscriber station to attach to the unidirectional network in proportion to the number of desired events being received and the duty cycle of those events based on the time slice interleaving of the event data transmitted by the unidirectional network. During intervals within a desired event when undesired event data is being transmitted, the subscriber station can reattach itself to the bidirectional network. In one embodiment these intervals are on the order of a few seconds. This means, for example, that the subscriber station can attach to a unidirectional network and receive desired MPEG-2 transport stream packets of multimedia, such as video streams, during the time slices in which the desired event packets are sent. When a time slice occurs in which no desired event data packets are being transmitted, the subscriber station can attach to a different network, such as a bidirectional network. In one embodiment, when no events are being received, the subscriber station "parks" itself on the bidirectional network. In the toggle mode, the modem in the subscriber station attaches itself to the relevant networks quickly in order to accommodate the time slicing interval constraints. For example, the attachment to the network can involve tuning the modem to the network frequency, letting the modem settle, searching for and finding a frame preamble (such as in a standard IEEE 802.16e frame), and achieving frame synchronization, i.e. frame control header (FCH) and downlink and uplink map reception. This attachment to the network may occur within a few time division duplex (TDD) frames of the unidirectional network.

In one embodiment, when a subscriber station is using time slicing for network switching, as in FIG. 8, it interprets the arriving IP stream from the unidirectional network and extracts timing and other information necessary to accomplish time slicing from the headers encapsulating the IP packets in the IP stream. This information informs the receiver when the current time slice or packet of the desired event content ends and when the next time slice of the desired event content begins. Knowledge of the beginning and end times of the desired event time slices allows the subscriber station to keep its modem attached to the unidirectional network transmitting the event data until the current desired time slice completes and then to attach the modem to another network for utilization of services on that other network until the next desired event time slice begins on the unidirectional network.

In the embodiments described above, one RF modem handles switches back and forth between two networks, such as a unidirectional network on one frequency and a bidirectional network on another frequency. In one embodiment, a subscriber station can utilize the switching techniques and methods described herein to both receive broadcast multimedia data, such as video streams, from a unidirectional network and to engage in bidirectional communication on another network, such as engaging in IP-based transactions on the other network. A user of a subscriber station implementation, such as a personal media player, handset, portable digital assistant, laptop computer, or the like, in the system described above can use the unidirectional network to receive content, for example multimedia content such as video, and can also use the bidirectional network for an uplink to subscribe for services offered on the unidirectional network, and for utilization of a conventional voice service or other bidirectional services.

Those of skill in the art will appreciate that the various illustrative modules and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

Moreover, the various illustrative modules and method steps described in connection with the embodiments disclosed herein can be implemented or performed with a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the present disclosure. Various modifications to these embodiments will be readily apparent to those skilled in the art, and the generic principles described herein can be applied to other embodiments without departing from the spirit or scope of the present disclosure. Thus, it is to be understood that the description and drawings presented herein represent exemplary embodiments of the invention and are therefore representative of the subject matter which is broadly contemplated by the present disclosure. It is further understood that the scope of the present invention fully encompasses other embodiments and that the scope of the present invention is accordingly limited by nothing other than the appended claims.

What is claimed is:

1. A method performed by a mobile device, the method comprising:
   receiving, from a first access point (AP) of a plurality of co-located APs, first information corresponding to the first AP, wherein the first information comprises: first state information and one or more first operational parameters, wherein the first information indicates a first frequency;
   receiving, from the first access point (AP), second information corresponding to a second AP of the plurality of co-located APs, wherein the second information comprises: second state information and one or more second operational parameters, wherein the second information indicates a second frequency, wherein the first information is different than the second information and the first AP is different than the second AP;
   establishing a first wireless link with a first wireless network of the first AP, in accordance with the first frequency;
   establishing a second wireless link with a second wireless network of the second AP, in accordance with the second frequency; and
   simultaneously receiving first data of the first wireless network from the first AP and second data of the second wireless network from the second AP;
   wherein the first wireless network is a bidirectional wireless network and the second information is received prior to establishing the second wireless link.

2. The method of claim 1, further comprising:
   receiving internet protocol (IP) packets over the second wireless link, wherein the IP packets are Motion Picture Experts Group (MPEG) traffic stream packets.

3. The method of claim 1, further comprising:
   receiving broadcast video on the second wireless link; and not receiving broadcast video on the first wireless link.

4. The method of claim 1, wherein the mobile device is incapable of transmitting on the second wireless network while receiving on the first wireless network.

5. The method of claim 1, wherein the first frequency and the second frequency are non-overlapping frequencies.

6. The method of claim 1, further comprising:
   storing the first information and second information in memory of the mobile device;
   wherein the storing is performed when the mobile device is not associated with the first AP.

7. The method of claim 1, wherein the first information comprises a first base station transmitter identification (BSID) corresponding to the first AP and the second information comprises a second base station transmitter identification (BSID) corresponding to the second AP, wherein the first BSID is different than the second BSID;
   wherein the first information and the second information is are received from the first AP when the mobile device is not associated with the first AP.

8. The method of claim 1, further comprising:
   entering into an idle mode by detaching from the second wireless network; and
   receiving data on the first wireless network while in the idle mode.

9. The method of claim 8, further comprising:
   not discarding association data after entering the idle mode; and
   transmitting a request, to the first AP, for the first information and the second information.

10. A mobile device comprising:
    a receiver operable to receive, from a first access point (AP) of a plurality of co-located APs, first information corresponding to the first AP, wherein the first information comprises: first state information and one or more first operational parameters, wherein the first information indicates a first frequency;
    the receiver operable to receive, from the first access point (AP), second information corresponding to a second AP of the plurality of co-located APs, wherein the second information comprises: second state information and one or more second operational parameters, wherein the first information indicates a second frequency, wherein the first information is different than the second information and the first AP is different than the second AP;
    circuitry operable to establish a first wireless link with a first wireless network, of the first AP, in accordance with the first frequency;
    circuitry operable to establish a second wireless link with a second wireless network of the second AP, in accordance with the second frequency; and
    the receiver operable to simultaneously receive first data of the first wireless network from the first AP and second data of the second wireless network from the second AP;
    wherein the first wireless network is a bidirectional wireless network and the second information is received prior to establishing the second wireless link.

11. The mobile device of claim 10, further comprising:
    the receiver operable to simultaneously receive internet protocol (IP) packets over the first wireless link and the second wireless link.

12. The mobile device of claim 10, wherein the first information is received when the mobile device is not associated with the first AP.

13. The mobile device of claim 10, wherein the second information is received from the first AP when the mobile device is not associated with the first AP.

14. The mobile device of claim 10, further comprising:
    circuitry operable to enter into an idle mode upon detachment from the second wireless network; and
    the receiver operable to receive data of the first wireless network while in the idle mode.

15. The method of claim 1, wherein the first information comprises information identifying the first AP and the second information comprises information identifying the second AP.

16. The mobile device of claim 10, wherein the first state information comprises at least one counter which is maintained by the mobile device when the mobile device is not associated with the first AP.

17. The mobile device of claim 10, further comprising:
    the receiver operable to receive an indication to switch to an AP, of the plurality of co-located APs, from one of the first AP or the second AP.

18. A mobile device comprising:
    a receiver operable to receive, from a first access point (AP) of a plurality of co-located APs, information comprising: a first base station transmitter identification (BSID) and a second BSID, wherein the first BSID corresponds to a first wireless network of the first AP and the second BSID corresponds to a second wireless network of a second AP of the plurality of co-located APs, wherein the first wireless network and the second wireless network are different wireless networks, wherein the first BSID and second BSID are different BSIDs; and the receiver operable to receive first data of the first wireless network from the first AP and second data of the second wireless network from the second AP;

wherein the second wireless network is a bidirectional wireless network and the information is received prior to reception of the second data.

19. The mobile device of claim 18, wherein the receiver is only operable to receive data from the first AP and the second AP on an alternating basis.

20. The mobile device of claim 18, wherein the information includes state information corresponding to a counter; wherein the counter is maintained in memory of the mobile device when the mobile device is not associated with the first AP.

* * * * *